United States Patent [19]

Brooks et al.

[11] Patent Number: 5,344,852
[45] Date of Patent: Sep. 6, 1994

[54] UNSATURATED POLYESTER-POLYURETHANE HYBRID RESIN FOAM COMPOSITIONS

[75] Inventors: Gary T. Brooks, Naperville; Harold R. Edwards, Jr., Geneva; Kathy J. Thrash, St. Charles; Donald E. Rubis, Aurora; David P. Sinclair, Winfield, all of Ill.

[73] Assignee: Aristech Chemical Corporation, Pittsburgh, Pa.

[21] Appl. No.: 21,716

[22] Filed: Feb. 24, 1993

Related U.S. Application Data

[63] Continuation of Ser. No. 892,765, Jun. 3, 1992, abandoned, which is a continuation of Ser. No. 821,704, Jan. 16, 1992, abandoned.

[51] Int. Cl.$^5$ .............................................. C08G 18/14
[52] U.S. Cl. ....................................... 521/99; 521/110; 521/113; 521/163; 521/172; 521/173; 252/182.24; 252/182.25; 252/182.26
[58] Field of Search ................. 521/99, 110, 113, 163, 521/172, 173; 252/182.24, 182.25, 182.26

[56] References Cited

U.S. PATENT DOCUMENTS 4,460,714  7/1984  Kamens ............................. 521/122

Primary Examiner—Maurice J. Welsh
Attorney, Agent, or Firm—William L. Krayer

[57] ABSTRACT

Water blown, thermosetting unsaturated polyester-polyurethane hybrid foam compositions are formed by the reaction of an A side composition and a B side composition. The A side composition comprises a polyfunctional isocyanate compound and a free radical initiator. The B side composition comprises a mixture of: (i) an ethylenically unsaturated monomer solution having dissolved therein about 30–90 weight percent of a polyester polyol having at least one ethylenically unsaturated group per molecule which has predominantly hydroxyl end groups; (ii) an amine compound having two or more primary or secondary amine groups in an amount effective to react with the A side composition to form small urea domains finely dispersed within a continuous polyester-polyurethane hybrid phase; and (iii) about 25 to about 150 equivalents water based on 100 equivalents of active hydrogen in the B side. When the A and B side compositions are reacted, the composition will have a ratio of active NCO groups of the isocyanate to active NH groups of the amine compound of between about 10:1 and about 50:1. and an isocyanate index, NCO:(NH+OH+COOH+HOH), of between about 0.5 and about 2.0.

32 Claims, No Drawings

UNSATURATED POLYESTER-POLYURETHANE HYBRID RESIN FOAM COMPOSITIONS

This is a continuation of application Ser. No. 892,765, filed Jun. 3, 1992, which is a continuation of our application Ser. No. 821,704, filed Jan. 16, 1992, both now abandoned.

BACKGROUND OF THE INVENTION

This invention relates to unsaturated polyester-polyurethane hybrid resin foam compositions. More specifically, this invention relates to improved water blown, thermosetting, unsaturated polyester-polyurethane hybrid resin foam compositions.

Polyester-polyurethane hybrid resins are well-known in the art of thermoset compositions. These resins are normally tougher than unsaturated polyesters and stronger, stiffer and less expensive than polyurethanes. Such hybrid resins usually comprise a hydroxy-terminated unsaturated polyester polyol, an ethylenically unsaturated monomer such as styrene and a polyisocyanate. Such resins are described in Edwards, 39th Annual Conference, Reinforced Plastics/Composites Institute, The Society of the Plastics Industry, Inc., Jan. 26–29, 1984. They have been commercially available from Amoco Chemical Company under the trademark Xycon hybrid resins and supplied as two component systems having an A and a B side. The A side contains the polyisocyanate and a free radical initiator, while the B side contains the hydroxy-terminated unsaturated polyester polyol/styrene solution and optionally a peroxide promoter and a polyurethane catalyst and a filler.

Polyester resin foam compositions are described in U.S. Pat. No. 4,460,714, which discloses a low density polyester resin foam made from an admixture of an unsaturated polyester resin, an organic isocyanate compound, a blowing agent, a peroxide curing agent system, a surfactant, and small amounts of an inorganic iron salt. The use of an amine compound, as in the present invention, to impart nucleation sites to the foam composition is not disclosed.

The prior art, including U.S. Pat. Nos. 3,325,421; 4,310,448; 4,305,857; 4,184,990; 4,093,569; 4,092,275; 4,310,449; 4,496,678; 4,147,680; 4,305,858 and 4,523,025, teaches the preparation of dispersions of polyisocyanate polyaddition products in hydroxyl-containing compounds to form polyurea polyaddition products, polyurethane resins and foams. In all of these references, a nearly balanced NCO:NH ratio is disclosed, whereas the present invention uses about a 10:1 or greater ratio of NCO:NH to provide a rigid urea phase imparting nucleation sites for foaming within a polyesterpolyurethane hybrid phase.

U.S. Pat. No. 4.855,368 teaches the combination of a polyol, a polyisocyanate and an aromatic amine to prepare reaction injection molding compounds. The aromatic diamine is added to the polyol and then mixed with the polyisocyanate during molding, but no foam compositions are disclosed. U.S. Pat. No. 4,868,231 discloses sheet molding compounds that use aromatic diamines as thickening agents via "in situ" fermation of polyureas. There the molar ratio of isocyanate to amine is generally from about 0.6 to about 1.4 and, preferably, from about 0.8 to about 1.2 (Col. 7, lines 31–33).

In commonly assigned, co-pending U.S. patent application Ser. No. 575,069, incorporated by reference herein, solid molding compositions are disclosed having a soft polyurea phase within a more rigid polyesterpolyurethane hybrid phase. The soft polyurea phase enables improved impact and shrink control. The compositions taught therein are substantially water-free and no foam compositions are taught. Further, there is no disclosure of a rigid urea phase which imparts finely dispersed nucleation sites within a polyester-polyurethane hybrid foam composition, as taught herein.

SUMMARY OF THE INVENTION

The invention comprises improved water blown, thermosetting, unsaturated polyester-polyurethane hybrid resin foam compositions formed by the reaction of an A side composition and a B side composition. The A side composition comprises a polyfunctional isocyanate compound and a free radical initiator. The B side composition comprises a mixture of: (i) an ethylenically unsaturated monomer solution having dissolved therein about 30–90 weight percent of a polyester polyol having at least one ethylenically unsaturated group per molecule which has predominantly hydroxyl end groups; (ii) an amine compound having two or more primary or secondary amine groups in an amount effective to react with the A side composition to form a first urea phase comprising small urea domains finely dispersed within a second polyester-polyurethane hybrid phase; and (iii) about 25 to about 150 equivalents water based on 100 equivalents of active hydrogen in the B side not including active hydrogen from water. Optionally, a foam catalyst, a peroxide promoter, a urethane catalyst, a silicone surfactant and a filler can be added to the B side. When the A and B side compositions are reacted, the composition will have a ratio of active NCO groups of the isocyanate to active NH groups of the amine compound of between about 10:1 and about 50:1, and preferably between about 10:1 and about 30:1, and an isocyanate index, NCO:(NH+OH+COOH+HOH), of between about 0.5 and about 2.0, preferably between about 0.8 and about 1.5, and most preferably between about 0.8 and about 1.3.

The process for making the two phase polyester-polyurethane hybrid resin foam compositions of the invention comprises reacting:

(1) an A side composition comprising a polyfunctional isocyanate and a free radical initiator; and (2) a B side composition comprising a mixture of:
 (i) an ethylenically unsaturated monomer solution having dissolved therein about 30-90 weight percent of a polyester polyol having at least one ethylenically unsaturated group per molecule which has predominantly hydroxyl end groups; (ii) an amine compound having two or more primary or secondary amine end groups in an amount effective to react with the A side composition to form small urea domains finely dispersed within a continuous polyester-polyurethane hybrid phase; and (iii) about 25 to about 150 equivalents water based on 100 equivalents of active hydrogen in the B side;

wherein when the A and B sides are reacted the ratio of active NCO groups of the isocyanate to active NH groups of the amine compound is between about 10:1 and about 50:1, and preferably between about 10:1 and about 30:1, and the isocyanate index, NCO:(NH+OH+COOH+HOH), is between about 0.5 and about 2.0, preferably between about 0.8 and about 1.5, and most preferably between about 0.8 and about 1.3.

In a preferred embodiment, at the time of use, the B side components are thoroughly mixed, prior to reacting with the A side, i.e., preferably within about 24 hours of reacting with the A side. In another preferred embodiment of the invention, the hybrid resin foam compositions comprise about 20–40 weight percent isocyanate, about 50–80 weight percent polyol in monomer solution and about 1–10 weight percent amine compound.

DETAILED DESCRIPTION OF THE INVENTION

For the purpose of this disclosure, the term "cure" or "curing" means the transformation of the hybrid resin foam composition from a liquid to a gel or solid state. This curing occurs by reaction of the hybrid system, including the reaction of isocyanate with active hydrogen-containing compounds and a vinyl addition crosslinking reaction. The vinyl addition reaction occurs primarily between the ethylenically unsaturated monomer and the unsaturated polyester polyol. Depending on the catalysts employed, curing can optimally occur at the time of use at temperatures of about 25° C. to about 125° C. for a time of about 1 sec to about 10 rains, and most preferably 10 secs to about 1 min.

As used herein, the term "isocyanate index" is the stoichiometric ratio obtained by dividing the number of NCO groups of the isocyanate compound by the sum of the active hydrogens, principally the NH+OH+COOH+HOH groups of the amine compound, the polyester polyol hydroxyl and acid end groups and water, i.e., NCO:(NH+OH+COOH+HOH). The term "closed cell" as used herein refers to cells or void spaces which are discrete and in which the gas phase of such cell is independent of that of other cells. The term "polyfunctional" as used herein is intended to include functionalities of two or greater.

The invention is a polyester-polyurethane hybrid resin foam composition system which is provided as an A side composition and a B side composition. The end user of the system reacts the A and B side compositions at the time of use of the foam composition to obtain improved thermoset foam products according to the invention. The foam compositions can be used as laminates and backings for such items as boat hulls, bath and laundry tubs or basins, spas and shower stalls, and many other applications in which the foam can provide structural support or insulation. Other applications include cores and structural inserts such as ribs, and molded articles such as gun plugs.

The A side of the foam compositions of the invention comprises a polyfunctional isocyanate and a free radical initiator. The polyisocyanate compound must have at least two NCO functional groups per molecule and be capable of reacting with the amine compound and the polyester polyol. Examples of suitable polyisocyanate compounds include 4,4'-diphenylmethylene diisocyanate (MDI). polycarbodiimide-modified diphenylmethane diisocyanate, polymethylene polyphenylisocyanate (PMPPI). 2.4- and 2,6-toluene diisocyanate (TD! ), naphthalene diisocyanate, metaphenylene diisocyanate, isophorone diisocyanate, hexamethylene diisocyanate and mixtures thereof. Preferred isocyanates are aromatic and liquid at room temperature. Most preferred are polymeric MDI's and PMPPI's.

The free radical initiators useful in producing the foam compositions of this invention, when mixed with the B side, initiate free radical formation enabling network development via vinyl addition polymerization. These free radical initiators are well-known to those skilled in the art, and include peroxides, peroxyesters, and azo compounds or any other suitable compound capable of initiating free radical formation and the vinyl polymerization of the polyester polyol and the ethylenically unsaturated monomer. Illustrative of a few such compounds are benzoyl peroxide (BPO), tertiarybutyl peroxybenzoate (TBPB), 2,2'-azo-bis-isobutyronitrile, dibenzoyl peroxide, lauryl peroxide, di-t-butyl peroxide, diisopropyl peroxide carbonate and t-butyl peroxy-2-ethylhexanoate, with BPO being preferred in this invention.

The B side composition comprises (i) an ethylenically unsaturated monomer solution having dissolved therein about 30–90 weight percent of a polyester polyol having at least one ethylenically unsaturated group per molecule which has predominantly hydroxyl end groups; (ii) an amine compound having two or more primary or secondary amine end groups in an amount effective to react with the A side composition to form small urea domains finely dispersed within a continuous unsaturated polyesterpolyurethane hybrid phase; and (iii) about 25 to about 150 equivalents of water based on 100 equivalents of active hydrogen in the B side. Optionally, a foam catalyst, a peroxide promoter, a silicone surfactant, a urethane-catalyst and a filler can be added to the B-side.

The ethylenically unsaturated monomers useful in the foam compositions of the invention can be any ethylenically unsaturated monomer capable of copolymerizing with the unsaturated polyester polyol to form a crosslinked polymer network. Examples of useful ethylenically unsaturated monomers are styrene, o-, m-, p- methyl styrene, methyl acrylate, methyl methacrylate, t-butylstyrene, divinyl benzene, diallyl phthalate, triallyl cyanurate and mixtures thereof. The preferred monomer is styrene because it provides an economical monomer solution.

The unsaturated polyester polyol has at least one ethylenically unsaturated group per molecule and predominantly hydroxyl end groups and preferably an acid number less than five. It is preferably an oligomer of an alpha, beta-ethylenically unsaturated dicarboxylic acid compound obtained by the condensation reaction of one or more of a saturated di- or polycarboxylic acid or anhydride and one or more unsaturated di- or polycarboxylic acid or anhydride with an excess of glycols or polyhydric alcohols. The unsaturated polyester polyol can also be prepared from unsaturated di- or polycarboxylic acid(s) or anhydride(s) with an excess of glycols and/or polyhydric alcohol(s). The polyols used in this invention preferably have an acid number less than five, and most preferably less than about two. Further, the polyols used in this invention have equivalent weights (100% solids basis) of between about 250 and about 1000, and preferably between about 250 and about 600. Examples of suitable saturated di- or polycarboxylic acids include isophthalic, orthophthalic, terephthalic, adipic, succinic, sebacic acid and mixtures thereof, with isophthalic acid being preferred. Typical unsaturated carboxylic acids or anhydrides include maleic acid, fumaric acid, citaconic acid, chloromaleic acid, allyl succinic acid, itaconic acid, mesaconic acid, their anhydrides and mixtures thereof, with maleic anhydride being the preferred choice. Examples of glycols and polyhydric alcohols which are useful in the invention include neopentyl glycol, ethylene glycol, diethylene glycol, triethylene glycol, propylene glycol, dipropylene glycol, 1,4-butanediol, polyethylene glycol, glycerol, mannitol, 1,3-propanediol, pentaerythritol, 1,6-hexanediol, 1,3-butanediol and mixtures thereof, with neopentyl glycol, ethylene glycol, diethylene glycol and mixtures thereof being preferred.

The amine compounds suitable for use in the invention are liquid at ambient temperature and soluble in the B side. The equivalent ratio of polyol to amine compound is about 99:1 to about 50:50, preferably about 95:5 to 80:20 and most preferably about 90:10. The preferred amine compounds are aromatic aliamines, especially diethyltoluenediamine which provides a stable hybrid system and produces an optimal density and cellular structure. Other amine compounds, which are not normally soluble in the B side, may be dispersed, in the B side using common solvents for amines. The solvent then acts as a carrier and aids in the dispersal of the amine compound in the B side.

In foam products, blowing agents are normally added to form gas bubbles in the polymerization mixture. The cellular foams of the present invention are "water blown" foams in which carbon dioxide formed by the reaction of water with isocyanate is the blowing agent. The water-isocyanate reaction is exothermic, and the heat produced from this reaction further aids expansion of the foam and the completion of polymerization of the hybrid resin. Water blown foams are more environmentally advantageous than cellular foam manufactured using chlorocarbon and chlorofluorocarbon blowing agents which are believed to contribute to ozone depletion in the stratosphere. Water blown foams are also more environmentally advantageous than cellular foams manufactured using volatile organic compounds such as butane. Therefore, although these blowing agents may be useful in the present invention in whole or in part, they are not preferred.

The B side preferably contains a tertiary amine catalyst and a peroxide promoter. These catalysts may be the same or different depending on the application. Examples of tertiary amine catalysts include N,N-dimethylarninoethanol, N,N-dimethylcyclohexylarnine (N,N-DCHA), bis-(2-dimethyl aminoethyl) ether, N,N-dimethylbenxylamine, and diaminobicyclooctane (DABCO). A preferred tertiary amine catalyst useful in this invention is N,N-dicyclohexylamine (N,N-DCHA), sold under the tradename Polycat 9 by Air Products, Allentown, PA. The purpose of the tertiary amine catalyst is to activate the isocyanate group to nucleophilic substitution leading in the case of water to carbon dioxide generation and in the case of the polyhydroxyl compound to urethane formation.

The peroxide promoter is used in combination with the free radical initiators of the A side to control the rate of free radical initiation. Examples of commonly used benzoyl peroxide promoters preferred in the invention are N,N-diethylaniline (DEA), dimethyl-p-toluidine (DMPT) and dimethylaniline.

Optionally, additional catalysts for the urethane reaction can be used. Mixtures of catalysts may be required to maintain a balance between the reaction of the isocyanate with the polyhydroxyl compound to form the urethane and the reaction of isocyanate with water. These catalysts are well-known to those skilled in the art. One preferred urethane catalyst useful in the invention is a dirnethyltin dicarboxylate, sold under the tradename UL-28 by Witco Corp., New York, New York.

Additionally, a silicone surfactant may be used in the foam compositions of the invention for the purpose of increasing surface tension of the liquid mixture thereby entrapping the $CO_2$ bubbles formed in the reaction of the polyisocyanate with water. Surfactants are essential ingredients in the manufacture of most reactive foams. Surfactants, or mixtures thereof, aid in mixing incompatible components, controlling foam cell size and the degree of cell opening by reducing stress concentrations during rising, and preventing cell collapse. Silicone fluids are the preferred surfactants, however, non-ionic, organic surfactants may also be used. A preferred silicone surfactant in the present invention is DC-197 available from Dow-Corning, Midland, Michigan.

Chain extenders or curatives may also be used in the hybrid resin foam compositions of the invention. These include low molecular weight diols and polyols, such as ethylene glycol, hydroxyl-terminated polyethylene oxide (polyethylene glycol) and glycerin. One preferred chain extender useful in the present invention is Carbowax-400, Union Carbide, Danbury, Connecticut, which is a polyethylene glycol. Other common chain extenders which may be used in the invention include diemines and polyamines that, when blended with the B side and reacted with the A side, will not phase separate from the foam compositions. Examples of such amine compounds are ethylenediamine, low molecular weight polyoxypropylenediamines, dimethyldiaminodicyclohexylmethane, dimethyldiaminodicyclohexylmethane, and 1,2-propanediamine. Such chain extenders provide several benefits to the foam compositions of the invention including reaction with the isocyanate to improve flexibility, impact resistance, reaction rate, and enhance selfskinning. Other optional components include pigments and colorants.

Optionally, fillers, fibers, catalysts, pigments, flame retardants, processing aids such as thixotropic agents and internal lubricants, all of which are well known to those skilled in the art, can be added to the foam compositions of the invention. Various organic or inorganic fillers or fibers can be added to reduce the exotherm of the reaction of the A and B sides, improve the reinforcing properties of the hybrid foam and reduce its cost. Fillers include such materials as talc, calcium carbonate, silica beads, calcium sulfate, aluminum trihydrate, ammonium polyphosphate, etc., with calcium carbonate being one preferred filler in the invention. The amounts of filler or other additives will vary depending on the application.

While applicants do not wish to be bound by any theory, it is believed that the amine compounds of this invention can be characterized as being more reactive to isocyanate compounds than those compounds having nitrogen-free reactive groups such as water and the polyester polyol containing primary hydroxyl, secondary hydroxyl, tertiary hydroxyl, or COOH groups. The difference in reactivity between the amine groups and the other reactive groups, including the acid and hydroxyl groups of the polyol and water, is believed to be great enough that, when blended with polyfunctional isocyanates. Two phases are formed in which one phase comprises small urea domains (referred to herein as the "first urea phase") finely dispersed within a second continuous phase (referred to herein as the "second unsaturated polyester-polyurethane phase").

The first urea phase is a solid under the conditions of foam preparation comprising small urea domains which provide nucleation sites within the hybrid foam composition. The urea domains must be small to act as efficient nucleators. "Small urea domains" as used herein means urea particles which average less than about 3 microns in size. Preferably, the small urea domains formed according to this invention average about 1 micron or less.

The first urea phase is further characterized as having a glass transition temperature or melting temperature higher than the second polyesterpolyurethane phase. The preferred amine compound is one that when reacted with an isocyanate will produce a urea phase having a glass transition or melting temperature of at least 150° C. The separation of the urea phase from the polyol/polyisocyanate mixture is believed to be influenced by the structure, functionality and molecular weight of the amine compound.

Phase separation of the urea phase should be rapid, preceding the generation of significant quantities of carbon dioxide from the reaction of isocyanate with water. When the partial pressure of $CO_2$ in the system exceeds the external pressure, bubble formation may occur. Formation of uniform, fine-celled foams requires nucleation. The small, rigid urea domains act as nucleating sites. The smaller and more well-dispersed the nucleating sites are, the more uniform the cell size will be. Next, as the second unsaturated polyester-polyurethane phase begins to cure, the foam is stabilized through the development of the hybrid thermoset network and eventual vitrification of the resin. Thus, the stoichiometric excess of NCO to NH is critical in the instant invention to allow the unconsumed NCO groups of the isocyanate to react with water to form the $CO_2$ blowing agent, and to react with the active hydrogen groups of the polyester polyol to form the polyesterpolyurethane hybrid network. The in situ formation of the first urea phase in the polyester-polyurethane foam compositions of the invention results in novel foam compositions having a balance of properties not found in previous foam compositions. These properties include uniform, fine, primarily closed cell structure, lower densities, and better physical properties than previous unsaturated polyester foams.

The hybrid resin foam compositions of the invention can be fabricated using liquid reactive molding techniques commonly employed in the foam industry. Open molding comprises spraying the mixed foam composition onto a surface or substrate. This process is commonly termed "spray-up." Direct pour liquid molding comprises hand-mixing the A side with the B side and then pouring the hybrid liquid into or onto a mold wherein foam formation and curing occurs. The main differences between spraying-up and pouring are the mix time, mix intensity and fluid delivery pressure. In both techniques, the polyol and/or polyisocyanate can contain fibrous materials, fillers and/or other additives.

The preferred liquid foam system used in this invention has at least two liquid streams which feed into a mix head. In a two stream system, the B side components are first mixed, then pumped into the mix head where the A side is introduced at the predetermined isocyanate index, at which time the foam is quickly delivered to a substrate, such as steel and coated steel products, wood, plastic, cardboard, acrylic sheets, gel or Teflon coats or other suitable solid substrate to which the foam compositions will adhere. The amine compound can be mixed with the polyol or added as a third stream using a plural component mix-head. The latter would require an additional feed line. Water is incorporated into the B-side. The only mixing requirement is that the amine compound is thoroughly mixed with the polyol and water either before introduction of the polyisocyanate, or using the plural component mix-head.

Preferably, the foam compositions of the invention have a density of about 1–10 lbs/ft$^3$ in the unfilled form. If a filler is used, the density will be greater, but the foam compositions of the invention can be advantageously applied to foams having up to about 50 percent filler at densities of up to about 35 lbs/fi$^3$. Also preferably, the compositions of the invention provide foams having a plurality of uniform, fine, closed cell structure. Most preferably, the foam compositions of the invention have a majority of closed cells, i.e., greater than abou,t 50 percent and preferably greater than about 75 percent.

PREPARATION OF POLYESTER POLYOLS

Unsaturated polyester polyols which were used to prepare the hybrid resin foam compositions of the invention were prepared as follows:

Unsaturated polyester polyols were prepared by charging the reactants in Table 1 into a standard reaction kettle equipped with a mechanical stirrer, temperature sensor, a partial condenser comprising a glass column packed with Raschig rings, a total condenser and receiver. This apparatus was equipped with a heater and a temperature control device. For each run the entire reaction was carried out in an inert nitrogen atmosphere in which the nitrogen was passed through a flow meter and into the reaction medium near the mechanical stirrer. The reactants were heated slowly until the mixture could be agitated. The reactants were further heated until an overhead temperature of about 98–100° C. was maintained. The reaction temperature at which water was liberated was about 150° C. Water was continuously removed from the reaction medium through the condenser system. The reaction mixture was heated to about 232° C. and held until the acid number was reduced to less than five, preferably to two or less, but most preferably, one or less.

Hydroquinone was then added to the reaction mixture, and the inhibited polyols were cooled to between 150° C. to 205° C. The polyols were then added to styrene monomer inhibited with 1,4-naphthoquinone and pbenzoquinone. The resulting polyols contained about 70–75 percent nonvolatile material (NVM). Typical liquid properties of Polyols 1, 2, 3 and 4 are reported in Table 2. A more detailed description of the basic preparation of unsaturated polyester polyols is found in "Processing Unsaturated Polyesters Based on Amoco Isophthalic Acid," Amoco Chemical Company Bulletin IP-43b, incorporated by reference herein.

Typical molecular weights of the polyester polyols (on a solid basis) useful in the instant invention are between about 500 and about 2000 g/mole, and preferably between about 500 and about 1200 g/mole. If the polyol is difunctional, the equivalent weight of the polyol is half the molecular weight, while polyfunctional polyols would have equivalent weights equal to the molecular weight divided by the OH functionality of the polyol.

TABLE 1

| | Polyester Polyol Formulations | | | |
|---|---|---|---|---|
| | Polyol 1 | Polyol 2 | Polyol 3 | Polyol 4 |
| Reactants | | | | |
| Isophthalic Acid, moles | 1.0 | 1.0 | 1.0 | — |
| Maleic Anhydride, moles | 1.0 | 2.0 | 2.0 | 3.0 |

TABLE 1-continued

Polyester Polyol Formulations

|  | Polyol 1 | Polyol 2 | Polyol 3 | Polyol 4 |
|---|---|---|---|---|
| Diethylene Glycol, moles | 2.64 | 2.42 | — | — |
| Ethylene Glycol, moles | — | 1.50 | 1.96 | 1.96 |
| Neopentyl Glycol, moles | — | — | 1.96 | 1.96 |
| Di-n-butyl tin maleate, ppm | 250 | 250 | 250 | 250 |
| Inhibitors |  |  |  |  |
| Hydroquinone, ppm | 150 | 150 | 150 | 150 |
| 1,4-Naphthoquinone, ppm | 75 | 75 | 75 | 75 |
| p-benzoquinone, ppm 30, 189 | 100 | 100 | 100 | 100 |

TABLE 2

Typical Liquid Resin Properties of Polyols

|  | Polyol 1 | Polyol 2 | Polyol 3 | Polyol 4 |
|---|---|---|---|---|
| Degree of unsaturation (mole/kg)* | 2.04 | 3.12 | 3.25 | 5.30 |
| Acid Number, solid basis - mg KOH/g | <2 | <2 | <2 | <2 |
| OH Number, solid basis - mg KOH/g. | 146 | 160 | 167 | 181 |
| Styrene Monomer, wt. % | 25 | 27.5 | 30 | 25 |
| Equiv. wt. as supplied - g/equivalent OH | 513 | 467 | 450 | 413 |

*The degree of unsaturation is calculated by dividing the weight of the polyester into the moles of maleic anhydride. The data is standardized to 1000 g of polyol.

The invention described herein is illustrated, but not limited, by the following examples.

EXAMPLES

EXAMPLE 1

Preparation of Polyester-Polyurethane Hybrid Resin Foam Compositions

The general procedure for preparing the A and B sides of a hybrid resin foam composition according to the invention is described below.

As reported in Table 3, a polyisocyanate sold under the trademark PAPI 2027 was used to prepare the A side. This polyisocyanate is manufactured by Dow Chemical, Midland, Michigan, and was used as received. PAPI 2027 is a polymethylene polyphenylisocyanate (PMPPI). PAPI 2027 is characterized as having an NCO functionality of 2.7, an isocyanate equivalent weight of 134.5 g/equivalent of NCO, a viscosity at 25° C. of 180 cps, and a density at 25° C. of 1.23 g/ml.

The A side was prepared by mixing the above polyisocyanate with 2 parts per hundred (php) of a prepared paste of benzoyl peroxide (BPO) and tricresyl phosphate (Luperco ATC, Atochem; Buffalo, New York). The addition of the BPO is based on parts per hundred of unsaturated polyol plus styrene.

The B side was prepared using Polyol 3 described above. To the polyol was added enough styrene monomer to reduce the NVM to 65 percent of the total solution weight. For example, a 1105.6 g sample of the hybrid resin foam according to the invention was prepared by first mixing all the B side ingredients except the water and filler, including 8.9 g diethyltoluenediamine (Ethacure 100), 432.0 g Polyol 3, 1.73 g N,N-DCHA (Polycat 9), 10.0 g polyethylene glycol (Carbowax-400), 0.78 g ethylene glycol, 0.78 g glycerin, 0.43 g DMPT, 2.16 g dimethyltin dicarboxylate (UL-28), and 5.40 g silicone surfactant (DC-197). The A side was prepared by mixing 322.8 g isocyanate (PAPI 2027) with 8.64 g BPO paste. Next, 4.48 g $H_2O$ and 307.5 g calcium carbonate filler were added to the B side, and the A and B sides were then mixed together.

All B side ingredients, except the water and calcium carbonate filler, were premixed using a high speed Premier Model 2000 dispersator mixer at room temperature. Ten equivalents of diethyltoluenediamine (DETDA), sold under the trademark Ethacure 100 by the Ethyl Corporation, Baton Rouge, Louisiana, were used as the amine component. Next, the water and filler were mixed with the B side using the Premier mixer until a homogeneous blend was achieved. With the B side mixing at a moderate speed setting of 3-4, the A side was added and mixed for 5 secs. The resinous liquid was then immediately poured onto a Teflon-coated cloth and allowed to free-rise and cure at ambient temperature. The total curing time for these hand cast foams was approximately 1 hr.

Five, 1-in square cubes were cut from the cured foam as test specimens. The standard ASTM procedures, ASTM D-2856, were used to measure foam density (lbs/ft$^3$ or pcf) and open cell content (OCC). The average density of these cubes was 8.3 pcf. The standard deviation in this measurement was 0.17 pcf. The open cell content was 11.7%. in contrast, an otherwise identical foam formulation prepared without the amine compound (diethyltoluenediamine) had a density of 10.1 pcf with a standard deviation of 0.31 pcf and an open cell content of 38.8%.

TABLE 3

Hybrid Resin Foam Formulations

|  | SAMPLES | | | | | | | | |
|---|---|---|---|---|---|---|---|---|---|
| INGREDIENTS | A | B | C | D | E | F | G | H | I |
| A SIDE | | | | | | | | | |
| Polyisocyanate (PAPI 2027), eq | 180 | 180 | 180 | 216 | 216 | 216 | 240 | 240 | 240 |
| BPO (Luperco ATC) (php) | 2 | 2 | 2 | 2 | 2 | 2 | 2 | 2 | 2 |
| B SIDE | | | | | | | | | |
| Polyol 3, eq @ 70 NVM | 80 | 80 | 80 | 80 | 80 | 80 | 80 | 80 | 80 |
| Diethyltoluenediamine (Ethacure 100), eq | 10 | 10 | 10 | 10 | 10 | 10 | 10 | 10 | 10 |
| $H_2O$, eq | 50 | 50 | 50 | 80 | 80 | 80 | 100 | 100 | 100 |
| N,N-DCHA (Polycat 9), php | 0.4 | 0.4 | 0.4 | 0.4 | 0.4 | 0.4 | 0.4 | 0.4 | 0.4 |
| Silicone Surfactant (DC-197), php | 1.25 | 1.25 | 1.25 | 1.25 | 1.25 | 1.25 | 1.25 | 1.25 | 1.25 |
| Polyethylene Glycol (Carbowax-400), eq | 5 | 5 | 5 | 5 | 5 | 5 | 5 | 5 | 5 |
| Ethylene Glycol, eq | 2.5 | 2.5 | 2.5 | 2.5 | 2.5 | 2.5 | 2.5 | 2.5 | 2.5 |
| Glycerin, eq | 2.5 | 2.5 | 2.5 | 2.5 | 2.5 | 2.5 | 2.5 | 2.5 | 2.5 |

TABLE 3-continued

Hybrid Resin Foam Formulations

| INGREDIENTS | SAMPLES | | | | | | | | |
|---|---|---|---|---|---|---|---|---|---|
| | A | B | C | D | E | F | G | H | I |
| DMPT, php | 0.1 | 0.1 | 0.1 | 0.1 | 0.1 | 0.1 | 0.1 | 0.1 | 0.1 |
| Dimethyltin dicarboxylate (UL-28), php | 0.5 | 0.5 | 0.5 | 0.5 | 0.5 | 0.5 | 0.5 | 0.5 | 0.5 |
| Calcium Carbonate Filler (% of total ingredients) | 0 | 15 | 30 | 0 | 15 | 30 | 0 | 15 | 30 |

The density of these hybrid foams can be adjusted by varying the levels of filler and water in the formulation. Nine representative hybrid foam formulations are presented in Table 3, designated A through I, Water levels between 50 and 100 equivalents were used while the calcium carbonate filler content was varied between 0 and 30 wt. %. Control foams were also prepared without the amine compound (DEDTA). Foam densities (pcf) and open cell content (OCC) are compared in Table 4.

TABLE 4

Hybrid Resin Foam Properties

| | | $H_2O$, equivalents | | | | | |
|---|---|---|---|---|---|---|---|
| | | 50 | | 80 | | 100 | |
| | DETDA, eq | 0 | 10 | 0 | 10 | 0 | 10 |
| | | $CaCO_3$, wt. % | | | | | |
| Sample | | A | | D | | G | |
| 0 | Density (pcf) | 5.07 | 4.95 | 2.99 | 3.31 | 2.68 | 2.76 |
| | OCC | 40.8 | 22.9 | 38.8 | 19.7 | 28.0 | 27.1 |
| Sample | | B | | E | | H | |
| 15 | Density (pcf) | 6.70 | 5.73 | 3.58 | 3.82 | 3.04 | 3.12 |
| | OCC | 15.7 | 9.6 | 24.3 | 24.7 | 33.9 | 29.9 |
| Sample | | C | | F | | I | |
| 30 | Density (pcf) | 10.1 | 8.28 | 5.17 | 4.96 | 3.84 | 3.98 |
| | OCC | 38.0 | 11.7 | 20.4 | 16.2 | 21.1 | 16.9 |

EXAMPLE 2

Spray-up Application of Hybrid Foam

A hybrid resin foam composition made in accordance with Example 1 readily adheres to a variety of substrates making spray-up a convenient way to apply foam. In this example, spray-up foam was dispensed to a temporary cardboard substrate using a variable ratio, plural component spray unit, Venus EPO-3 machine from Venus-Gusmer, Kent, WA. In the plural component spray unit, the A and B sides of the hybrid resin were charged to separate delivery systems. The two components were delivered to and mixed in a spray gun immediately before application. Optionally, the A and/or B sides can be heated. In this example, the B side was heated to 130° F. prior to use. The composition of the hybrid foam composition of this example is as follows:

| A SIDE | | B SIDE | |
|---|---|---|---|
| | Wt. % | | Wt. % |
| PAPI 2027 | 20.65 | Polyol 1 @ 75% NVM | 40.31 |
| Luperco ATC | 0.81 | Diethyltoluenediamine | 0.89 |
| | 21.46 | (Ethacure 100) | |
| | | Ethylene Glycol | 0.46 |
| | | Silicone Surfactant (DC-197) | 0.80 |
| | | UL-28 | 0.30 |
| | | DMPT | 0.50 |
| | | Polycat 9 | 0.16 |
| | | $H_2O$ | 0.27 |
| | | Pigment | 0.40 |

-continued

| A SIDE | B SIDE | |
|---|---|---|
| | $CaCO_3$ | 34.65 |

Thin, multiple layers were applied to the temporary cardboard substrate to prevent sagging and running. Once the foam composition was cured, the foam may be removed from the substrate for testing, Suitable permanent substrates include acrylic sheets, stainless steel, gel and Teflon coated substrates, plastic, wood or other suitable solid backing to which the foam will adhere. The foaming action appeared to occur after the hybrid was applied to the substrate surface. Foams of different thicknesses can thus be developed by varying the number of layers applied. The foam in this example had a density of 25 pcf.

EXAMPLE 3

Spray-up Foams

The density of a spray-up foam of the invention was adjusted by varying filler and $H_2O$ levels. The foam was applied to a cardboard substrate by the method described in Example 2. The formulation was:

| A Side | | B Side | |
|---|---|---|---|
| PAPI 2027 | 1.20 isocyanate index | Polyol 3 @ 70% NVM | 0.80 eq |
| Luperco ATC | 2.0 php | Ethylene Glycol | 0.025 eq |
| | | Glycerine | 0.025 eq |
| | | Carbowax 400 | 0.05 eq |
| | | Diethyltoluenediamine (Ethacure 100) | 0.10 eq |
| | | $H_2O$ | 0.55 or 1.0 eq |
| | | DMPT | 0.1 php |
| | | Polycat 9 | 0.4 php |
| | | UL-28 | 0.5 php |
| | | Silicone Surfactant (DC-197) | 1.25 php |
| | | $CaCO_3$ | 30 wt. % |

The density and open cell content of this foam composition are summarized in Table 5.

TABLE 5

| | H₂O, eq | | | |
|---|---|---|---|---|
| | 0.5 | | 1.0 | |
| Diethyltoluenediamine (Ethacure 100) | Yes | No | Yes | No |
| Density (pcf) | 7.03 | 8.05 | 3.67 | 4.55 |
| Standard Deviation | 0.13 | 0.12 | 0.16 | 0.03 |
| OCC, % | 38 | 55 | 68 | 85 |
| Standard Deviation | 4.2 | 10.1 | 7.8 | 0.6 |

EXAMPLE 4

Screening Test for Morphology

A simple screening test was developed to determine if urea phase separation occurred on mixing hybrid compositions. A small sample of the hybrid composition was prepared without filler or water. The composition was:

Polyisocyanate 1 eq
BPO paste 2 php
Polyol 3 0.9 eq
Amine Compound 0.1 eq
DMPT 0.1 php
Styrene to 65% NVM These compounds were thoroughly mixed and a drop of the liquid hybrid was placed on a microscope slide and covered with a glass cover plate. Urea phase separation turned the drop of hybrid opaque. The morphology was observed at magnifications of 200x and 400x, using a Nikon 260248 Optiphot Transmission microscope. Domain size was estimated using transmission electron microscopy (TEM) at 8,250X. Although the polyoxypropylenediamine (Jeffamine D2000, Texaco, Houston, Texas) enabled-phase separation, the urea domains averaged about 8 microns in diameter. This was 1 to 2 orders of magnitude larger than the diethyltoluenediamine-containing composition, which showed irregular-shaped clusters of particles of approximately 0.06 microns in diameter. The screening results for five amine compounds are shown in Table 6.

TABLE 6

| Phase Separation Screening Results | | |
|---|---|---|
| Amine Compound | Hybrid Appearance | Domain Size |
| Diethyltoluenediamine | Opaque | 1 micron |
| Polyoxypropylenediamine | Opaque | 8 microns |
| 4,9-dioxadodecane-1,12-diamine | Clear | — |
| Dimethyldiaminodicyclohexyl-methane | Clear | — |
| 1,2-propanediamine | Clear | — |

This screening test can be used to evaluate various amine compounds suitable for use in the foam compositions of the invention. The amine compounds useful in the invention will phase separate and optimally enable unfilled foam compositions having densities of about 10 lbs/ft³ or less, filled compositions of about 35 lbs/ft³ or less, urea domain sizes which average less than 3 microns and a plurality of closed cells, preferably 50% or more closed cells.

That which is claimed is:

1. A water blown, thermosetting, unsaturated polyesterpolyurethane hybrid foam resin composition formed by contacting:
   (a) an A side composition comprising a polyfunctional isocyanate compound and a free radical initiator; and
   (b) a B side composition comprising a mixture of:
      (i) an ethylenically unsaturated monomer having dissolved therein about 30–90 weight percent of a polyester polyol having at least one ethylenically unsaturated group per molecule which has predominantly hydroxyl end groups;
      (ii) an amine compound having two or more primary or secondary amine groups in an amount effective to react with the A side composition to form a first urea phase comprising small urea domains finely dispersed within a second polyester-polyurethane hybrid phase; and
      (iii) about 25 to about 150 equivalents water based on 100 equivalents of active hydrogen in the B side, not including active hydrogen from water; said composition having a ratio of active NCO groups of the isocyanate to active NH groups of the amine compound of between about 10:1 and about 50:1, and an isocyanate index, NCO:(NH+OH+COOH+HOH), of between about 0.5 and about 2.0.

2. The foam composition of claim 1, having a density of about 10 lbs/ft³ or less.

3. The foam composition of claim 1, wherein the urea domains comprise particles which average about 3 microns or less in diameter.

4. The foam composition of claim 1, wherein the closed cell content is about fifty percent or greater.

5. The foam composition of claim 1, wherein the composition comprises about 20–40 weight percent isocyanate, about 50–80 weight percent polyester polyol in monomer solution and about 1–10 weight percent amine compound.

6. The foam composition of claim 1, wherein the amine compound comprises an aromatic amine.

7. The foam composition of claim 6, wherein the aromatic amine compound is diethyltoluenediamine.

8. The foam composition of claim 1, wherein the amine compound is dissolved in an amine solvent.

9. The foam composition of claim 1, wherein the ethylenically unsaturated monomer solution comprises styrene.

10. The foam composition of claim 1, wherein the polyester polyol comprises a reaction product of at least one of a saturated di- or polycarboxylic acid or anhydride and an unsaturated di- or polycarboxylic acid or anhydride with a polyhydric alcohol, glycol or mixture thereof.

11. The foam composition of claim 10, wherein the saturated di- or polycarboxylic acid or anhydride comprises isophthalic acid, the unsaturated di- or polycarboxylic acid or anhydride comprises maleic anhydride, and the polyhydric alcohol or glycol is selected from the group consisting of diethylene glycol, ethylene glycol, neopentyl glycol and mixtures thereof.

12. The foam composition of claim 1, wherein the polyester polyol comprises a reaction product of an unsaturated di- or polycarboxylic acid or anhydride with a polyhydric alcohol, glycol or mixture thereof.

13. The foam composition of claim 1, wherein the B side further comprises a urethane foam catalyst.

14. The foam composition of claim 1, wherein the B side further comprises a peroxide promoter.

15. The foam composition of claim 1, wherein the B side further comprises a silicone surfactant.

16. The foam composition of claim 1, wherein the B side further comprises a filler.

17. The foam composition of claim 16, having a density of about 35 lbs/ft³ or less.

18. The foam composition of claim 1, wherein the B side further comprises a chain extender.

19. The foam composition of claim 1, wherein the B side further comprises a urethane catalyst.

20. The foam composition of claim 1, wherein the ratio of NCO to NH is between about 10:1 and about 30:1, and the isocyanate index NCO:(NH+OH COOH+HOH) is between about 0.8 and about 1.3.

21. The foam composition of claim 1, wherein the first urea phase has a glass transition or melting temperature higher than that of the second polyester-polyurethane phase.

22. The foam composition of claim 1, wherein the urea domains comprise particles which average about 1 micron or less in diameter.

23. A foam product made by the process of claim 1.

24. The B side composition useful in preparing the foam composition of claim 1.

25. A process for making a water blown, thermosetting, unsaturated polyester-polyurethane hybrid resin foam composition comprising reacting:
(a) an A side composition comprising a polyfunctional isocyanate and a free radical initiator, with
(b) a B side composition comprising a mixture of:
(i) An ethylenically unsaturated monomer having dissolved therein about 30–90 weight percent of an unsaturated polyester polyol having at least one ethylenically unsaturated group per molecule which has predominantly hydroxyl end groups;
(ii) an amine compound having two or more primary or secondary amine groups in an amount effective to react with the A side composition to form a first urea phase comprising small urea domains finely dispersed within a second polyester-polyurethane hybrid phase; and
(iii) about 25 to about 150 equivalents water based on 100 equivalents of active hydrogen in the B side, not including active hydrogen from water;
wherein the hybrid resin foam composition has a ratio of active NCO groups of the isocyanate to active NH groups of the amine compound of between about 10:1 and about 50:1 and an isocyanate index, NCO:(NH+OH+COOH+HOH), of between about 0.5 and about 2.0.

26. The foam product of claim 25.

27. The foam product of claim 26 wherein the product comprises about 20–40 weight percent isocyanate, about 50–80 weight percent polyester polyol in monomer solution, and about 1–10 weight percent amine compound; the ethylenically unsaturated monomer solution comprises styrene; the polyester polyol comprises a reaction product of at least one of a saturated di- or polycarboxylic acid or anhydride and an unsaturated di- or polycarboxylic acid or anhydride with a polyhydric alcohol, glycol or mixture thereof; wherein the density of the foam product is about 10 lbs/ft$^3$ or less; the urea domains comprise particles which average about 3 microns or less in diameter; the closed cell content is about fifty percent or greater; the first urea phase has a glass transition or melting temperature higher than that of the second polyester-polyurethane phase; and the B side further comprises a urethane foam catalyst, a peroxide promoter, and a silicone surfactant.

28. The foam product of claim 26, wherein the B side further comprises a filler.

29. The foam product of claim 26, having a density of about 35 lbs/ft$^3$ or less.

30. The foam product of claim 26, wherein the B side further comprises a chain extender.

31. The foam product of claim 26, wherein the ratio of NCO to NH is between about 10:1 and about 30:1, and the isocyanate index NCO:(NH+OH+COOH+HOH) is between about 0.8 and about 1.2.

32. The foam product of claim 26, wherein the saturated di- or polycarboxylic acid or anhydride comprises isophthalic acid, the unsaturated di- or polycarboxylic acid or anhydride comprises maleic anhydride, and the polyhydric alcohol or glycol is selected from the group consisting of diethylene glycol, ethylene glycol, neopentyl glycol and mixtures thereof.

* * * * *

UNITED STATES PATENT AND TRADEMARK OFFICE
CERTIFICATE OF CORRECTION

PATENT NO. : 5,344,852

DATED : September 6, 1994

INVENTOR(S) : Gary T. Brooks, Harold R. Edwards, Jr., Kathy J. Thrash, Donald E. Rubis, & David P. Sinclair It is certified that error appears in the above-identified patent and that said Letters Patent is hereby corrected as shown below:

Col. 3, line 22, change "rains" to "mins".
Col. 3, line 58 change "-" to ",".
Col. 3, line 58 change "!" to -- , --. (both occurrence)
Col. 4, line 25 take out "-".
Col. 5, line 10 change "aliamines" to "diamines".
Col. 5, line 40, change the "m" in dimethylcyclohexylarine" to "m".
Col. 5, line 14, take out "," after "dispersed".
Col. 5, line 64 change "m" in "dimethyltin to "m".
Col. 6, line 22 change "e" in "diemines" to "a".
Col. 6, line 59 change "Two" to -- two --.
Col. 8, line 8, change"fi" to "ft".
Col. 8, line 13 remove "," in word "about".
Col. 9, line 50 remove "." before "NCO".
Col. 10, line 46 capitalize "I" in "in".
Col. 13, line 35 remove the "-".
Col. 13, line 57 change "untilled" to "unfilled".
Col. 13, line 64 change "foam and resin" to read "resin foam".
Col. 9, line 15 remove "30,189".

Signed and Sealed this

Fifth Day of January, 1999

Attest:

*Attesting Officer*      *Acting Commissioner of Patents and Trademarks*